US006981133B1

(12) United States Patent
Donovan (10) Patent No.: US 6,981,133 B1
(45) Date of Patent: Dec. 27, 2005

(54) ZERO OVERHEAD COMPUTER INTERRUPTS WITH TASK SWITCHING

(75) Inventor: Brian Donovan, Wilsonville, OR (US)

(73) Assignee: Xyron Corporation, Vancouver, WA (US)

( * ) Notice: Subject to any disclaimer, the term of this patent is extended or adjusted under 35 U.S.C. 154(b) by 0 days.

(21) Appl. No.: 09/410,202

(22) Filed: Sep. 30, 1999

Related U.S. Application Data

(63) Continuation of application No. 09/023,333, filed on Feb. 13, 1998, now Pat. No. 5,987,601.

(60) Provisional application No. 60/038,729, filed on Feb. 14, 1997.

(51) Int. Cl.[7] .................................................. G06F 9/40
(52) U.S. Cl. ........................ 712/244; 710/264; 710/265
(58) Field of Search ........................ 712/244; 710/260, 710/264, 265

(56) References Cited

U.S. PATENT DOCUMENTS

| 3,226,694 A | | 12/1965 | Wise ............................ 710/264 |
| 3,757,306 A | * | 9/1973 | Boone .......................... 712/32 |
| 3,789,365 A | * | 1/1974 | Jen et al. ..................... 710/264 |
| 4,009,470 A | * | 2/1977 | Danilenko et al. ........... 711/151 |
| 4,010,448 A | | 3/1977 | Bennett et al. .............. 710/269 |
| 4,034,349 A | | 7/1977 | Monaco ....................... 710/48 |
| 4,047,161 A | | 9/1977 | Davis ........................... 709/108 |
| 4,507,727 A | * | 3/1985 | Magar .......................... 712/33 |
| 4,628,158 A | * | 12/1986 | Rubin .......................... 379/9.02 |
| 4,642,756 A | * | 2/1987 | Sherrod ....................... 709/103 |
| 4,888,691 A | * | 12/1989 | George et al. ............... 714/15 |
| 5,682,554 A | * | 10/1997 | Harrell ......................... 710/57 |

OTHER PUBLICATIONS

Stuart E. Madnick, "Operating Systems" 1974, McGraw-Hill, pp. 209-240.*

* cited by examiner

*Primary Examiner*—David Y. Eng
(74) *Attorney, Agent, or Firm*—Chernoff, Vilhauer, McClung & Stenzel, LLP (57) ABSTRACT

The invention constitutes a unique hardware zero overhead interrupt and task change mechanism for the reduction or elimination of interrupt latency and task change processing overhead delays in computer architectures. Without loss of time, the system performs complete task state saving and restoration between one cycle and the next without software intervention. For each Central Processing Unit (1) register, the invention uses one or more auxiliary latches (3, 4) wherein one latch (3, 4) is used as the "running" latch and one of the auxiliary latches is attached to task storage memory. The invention swaps connections between alternate "running" registers and auxiliary registers while transferring other tasks to and from task storage memory (2). The invention provides a task linking system to allow the linking of tasks for the mandatory sequential execution of the linked tasks. Further, the invention includes a priority "impatience" counter system to increase the relative priorities of various tasks as they approach their task deadlines.

5 Claims, 8 Drawing Sheets

Set Interrupt Enable latch if: Link Register task decoder asserted & LINKED

Clear Interrupt Enable latch IEL if: Link register task decoder & not LINKEED, and write
or: Running task decoder asserted & LINKED

| LINKED | write | Link register | Run task | Set/Clear IEL |
|--------|-------|---------------|----------|---------------|
| 1 | 0 | 1 | 0 | SET |
| 0 | 1 | 1 | 0 | CLEAR |
| 1 | 0 | 0 | 1 | CLEAR |
| Everything Else | | | | Nothing |

ZERO OVERHEAD COMPUTER INTERRUPTS WITH TASK SWITCHING

This patent application is a continuation of application Ser. No. 09/023,333 filed Feb. 13, 1998 now U.S. Pat. No. 5,987,601, which is a claims benefit of application Ser. No. 60/038,729 filed Feb. 14, 1997.

BACKGROUND OF THE INVENTION

This invention relates to interrupt processing and task switching circuitry and methods in data processing systems.

Modern computers use special hardware to automate interrupt processing and task switching. Interrupts include such events as I/O transfers, clocks, hardware faults, software interrupts and software faults such as divide by zero. So that the interrupting program does not alter the running program, all states of the interrupted task must be saved. Then, all of the new interrupting task states must be retrieved from memory and the processing then continued with these new interrupting task states. Once the interrupting task is completed, a Return From Interrupt instruction is usually executed causing the state save process to reverse itself and restore the previous task.

Most modern computers achieve the task change process using a hardware interrupt mechanism that first disables additional interrupts and saves only the minimum number of state registers before jumping to a special interrupt service program. The special interrupt service program then saves the rest of the task registers as may be required. It then loads the register for the interrupting tasks. This process is reversed for returning from interrupts so that the computer may then return to its original task.

During the saving and restoring of the registers, any further attempted interrupts must be disabled to prevent corruption of the system's existing data. Thus, the computer is insensitive to interrupts for these periods of time, known as interrupt latency. Traditional computer architectures must complete current instructions before responding to interrupts. Typically, these instructions vary widely in their durations. In addition, various computer architectures have different interrupt latencies depending upon the modes of the currently executing process and that of the interrupting process. These two factors combine to cause highly non-deterministic interrupt latency delays and overhead.

Besides the latency delay associated with beginning each new interrupt task, in state-of-the-art computers there is also the time spent switching between tasks. This switching time is the interrupt and task change processing overhead. It is the time used for saving and restoring the registers, and thus is time unavailable for use in processing. This interrupt and task change processing overhead amounts to tens or hundreds of cycles in many modern computers. Even at multi-Megahertz clock rates, the combination of both the latency delay and the time required with respect to switching overhead results in computers that can only process interrupts at tens or hundreds of Kilohertz. Meanwhile, multimedia data transfers take place at tens to hundreds of megahertz.

As a result of these modern computer time limitations in interrupt and task change latency and processing overhead, current computers cannot handle the required data rates without the use of extensive storage buffers and auxiliary specialized processors. The size of these buffers causes multimedia systems to span dozens of chips, each with its additional attendant cost. Even as technological advances place more memory on each integrated circuit, the large size and complexity of current buffered data transfer methods continue to cause excess manufacturing costs while decreasing computer operational performances. Modern applications require an ever greater number of interrupts which simply further aggravates the problem.

Multiple register interrupt and task switch systems have been proposed before, but all have suffered various limitations. In particular, the use of large register sets causes a concomitant increase in wiring and capacitance related delays, slowing down the entire computer. Other methods have used separate register stores for data storage, but this results in a waste of time during the course of the movement of the data to and from these task saving registers before the execution of an interrupt. Then, additional time must be used to load the working data into the general purpose registers before interrupt processing can begin.

A further disadvantage of conventional computer architectures is that they do not incorporate effective methods for tracing processor flow, including task changes, without expensive hardware emulators and logic analyzers. Meanwhile, conventional hardware emulators cannot test computers under actual operational conditions as they cannot run as fast as the computers that they are testing.

Also, computers lack hardware based task linking sequential execution systems and deadline priority "impatience" counters to permit interrupts to automatically increase their priorities with the passage of time.

Meanwhile, multicycle uninterruptable instructions also increase interrupt latency delays. These latency delays can be hundreds or even thousands of cycles long in modern complex computers.

Furthermore, current state-of-the-art CPU's pipeline the processing of data and instructions in order that more data and instructions can be processed in each cycle. This has a number of disadvantages. Whenever an interrupt comes in, the pipeline CPU must abandon whatever is unfinished in the pipeline, and reset the various counters to resume processing when it restarts. This is called a pipeline "stall". When a branch instruction is executed, the pipeline CPU must either guess at which way the branch will go, stall or try to follow the multiple, possible branch outcomes. All of these various pipeline CPU situations can cause computers to waste processing resources and result in further delays.

Additionally, conventional computer systems require extensive buffering to accommodate high data rates. Therefore, they are not generally as suitable for single-chip, unitary construction fabrication with its advantages in terms of costs, lower energy and cooling expenditures and increased performances.

SUMMARY OF THE INVENTION

In light of the above described problems and limitations with regard to the current structures and methods of operating conventional computers, it is an object of the present invention to provide a unique, zero overhead interrupt and task change mechanism for use in computer architectures for detecting interrupts in the background then performing complete state saving and restoring operations between one processor cycle and the next without software intervention while limiting the number of tasks only by the size of the task storage memory system and while preserving the zero overhead aspects of the mechanism regardless of the task memory access time.

It is a further object of this invention to prevent the loss of time by eliminating the need to transfer the running task's data to a separate task state storage element at the instant of the interrupt and task change event.

It is an additional object of the invention to permit the use of part of the system's task memory for the effective tracing of processor flow for full speed, real-time use in computer programming debugging.

It is an additional object of the invention to provide a task linking system to allow the linking of tasks for the mandatory sequential execution of the linked tasks as required in multi-tasking systems.

It is also an object of the invention to provide a priority "impatience" counter system to increase the relative priorities of various tasks as their task priority deadlines approach.

It is an additional object of the invention's interrupt and task change mechanism to eliminate the need for extensive storage buffers and auxiliary specialized processors with their associated costs and delays.

A further object of the invention is that it allows the interruption of what were previously considered to be uninterruptable instructions by switching the entire state of the task, not just the state of the CPU registers, to eliminate the latency otherwise involved in long multicycle uninterruptable instructions.

It is also an object of the invention to create a deterministic computer architecture structure to effectively eliminate latency unpredictability.

It is yet another object of the invention's interrupt and task changing mechanism to eliminate portions of previously required CPU pipeline and branch-prediction circuitries so as to better avoid computer stalls and delays.

Further, it is an object of the invention that the system be designed to be simple and compact enough in its circuitry so as to accomplish its objects within the confines of a single, small, integrated circuit capable of being implemented within a CPU within the limits of conventional fabrication processes so as to reduce the energy and cooling requirements of the invention's circuitry while enhancing computer processing speeds.

A benefit of the present invention is that it allows computers to process both interrupts and task changes with zero overhead and very few cycles of latency, typically just one or two from local memory. This is accomplished by employing hardware to completely automate the entire interrupt and task change process by detecting interrupts in the background then performing complete state saving and restoring operations between one processor cycle and the next without software intervention while limiting the number of tasks only by the size of the task storage memory system and while preserving the zero overhead of the mechanism regardless of the task memory access time, The present invention avoids the wiring and capacitance delays associated with large register banks. It uses a relatively small register set which is electrically decoupled from the computer's background process for saving and restoring the register states from a large memory store. This is of substantial benefit due to the much higher density of memory stores in comparison to register banks. In addition, at an expense in latency, external memory stores can be used for storing register states. This substantially increases the capacity of the system for additional available zero overhead tasks.

The interrupt and task change mechanism accomplishes its purpose by using two or more task latches per task register bit. Each such latch may be alternately connected to the large task memory store or the CPU. Thus, while the CPU is using one latch, data in another latch may be saved and further task data may be simultaneously loaded. A small state machine controls the sequencing of the task changes.

The interrupt and task change mechanism's architecture adds less than 2 gate delays over and above a simple register. The access time of the task storage random access memory (RAM) does not add to the interrupt and task change overhead. Current integrated circuit processes allow the task RAM to operate within one cycle, allowing a "worst case" interrupt and task change latency of 2 cycles.

In contrast to traditional computer systems, deterministic systems have a fixed latency independent of operating or interrupting modes, and independent of the duration of the current instruction.

In the current invention, the system is interruptable at any moment since the full state of the machine is preserved upon interrupt. The interrupt delay is one of two cycles of latency, and is thus far more deterministic than that of traditional computers.

A further benefit of this invention is that systems are much easier to design, test and debug using deterministic interrupt structures.

Yet another benefit of this invention is that it is fault tolerant, it can place itself or be placed in a mode which permits individual step-by-step debugging.

An additional benefit is that less processing power and less buffering is required to be kept in reserve when using a deterministic as opposed to a non-deterministic architecture resulting in less costly processor configuration.

A further benefit is that because it is deterministic, the invention facilitates new potential interrupt application opportunities.

Since this invention's interrupt and task change mechanism uses one of the task latches as the register connected to the CPU, no data transfer is required to a separate task state storage element as in other methods. The result is yet a further benefit in that time is saved during the course of the process.

An additional benefit of this interrupt and task change system is the ability to create a trace memory out of a portion of the task memory, thus allowing full speed, real-time debugging of computers based on this system.

Yet a further benefit of this invention is its task link system which allows tasks to be linked so that they must execute sequentially. This saves time over software methods.

The invention provides an additional benefit in that its task deadline priority counter system allows tasks that have signaled a hardware interrupt to automatically increase their priority with the passage of time. This is particularly appropriate for slower tasks like audio tasks, which can start off at a low priority. Usually the CPU will find time to serve the lower priority tasks, as anytime before the next sample period is fine. Sometimes, however, the CPU has many high priority tasks. In such cases, this invention's task deadline priority counter system gradually increases the priority of the lower priority tasks as their deadlines approach.

A further benefit of the invention is that computer systems designed with this interrupt and task change mechanism can handle multimedia data rates without significant buffering and its attendant control circuits. This allows greater I/O functionality with much less circuitry.

Yet another significant benefit of the invention is that it allows the interruption of what were previously considered to be uninterruptable instructions by switching the entire state of the task, not just the state of the CPU registers, to eliminate the latency otherwise involved in long multicycle interruptable instructions.

An additional benefit of this invention's interrupt and task switching system is its ability to replace pipelines and branch prediction functions in the CPU. The proposed invention solves the current problems which exist with pipelined CPUs. It accomplishes this without pipelines or branch prediction circuitry by simply switching tasks. No branch prediction is required. The CPU processes branch instructions as they occur. If the branch instruction requires data not in the local memory, the branching task is swapped for the waiting task and processing continues.

A further benefit of this invention is that it is simple and compact enough so as to permit its placement upon a single, small, integrated circuit compatible with existing fabrication processes. As a result, energy requirements for the actual circuitry are reduced, possible needs for cooling equipment with concomitant requirements for extra electrical cooling energy are either reduced or eliminated, and the CPU speed of processing is enhanced by the reduction in the size and complexity of the circuitry and the reduction thereby in the system's number of chips and chip interconnections.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
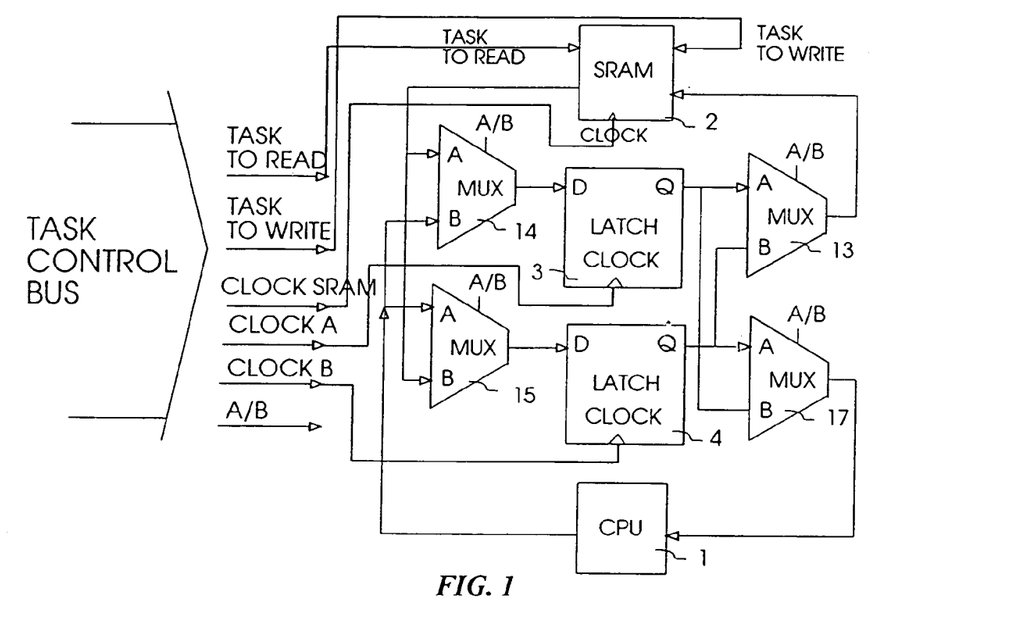
FIG. 1 is a circuit diagram of an embodiment of a bit slice of a task register in accordance with the present invention.

FIG. 1 schematically shows one bit slice of a task register for a computer 1. Thirty two such slices are used for each 32 bit register. Typically, a CPU would use a plurality of 32 bit registers. CPU 1 and static random access memory (SRAM) 2 can alternately be connected to latch 3 and latch 4 (never to the same latch). For discussion purposes we will start with latch 3 connected to the CPU and latch 4 connected to SRAM 2. In this configuration, the CPU is running the task stored in latch 3. While the CPU 1 is running a program using task latch 3, the hardware processes interrupts in the background.

Figure 3:
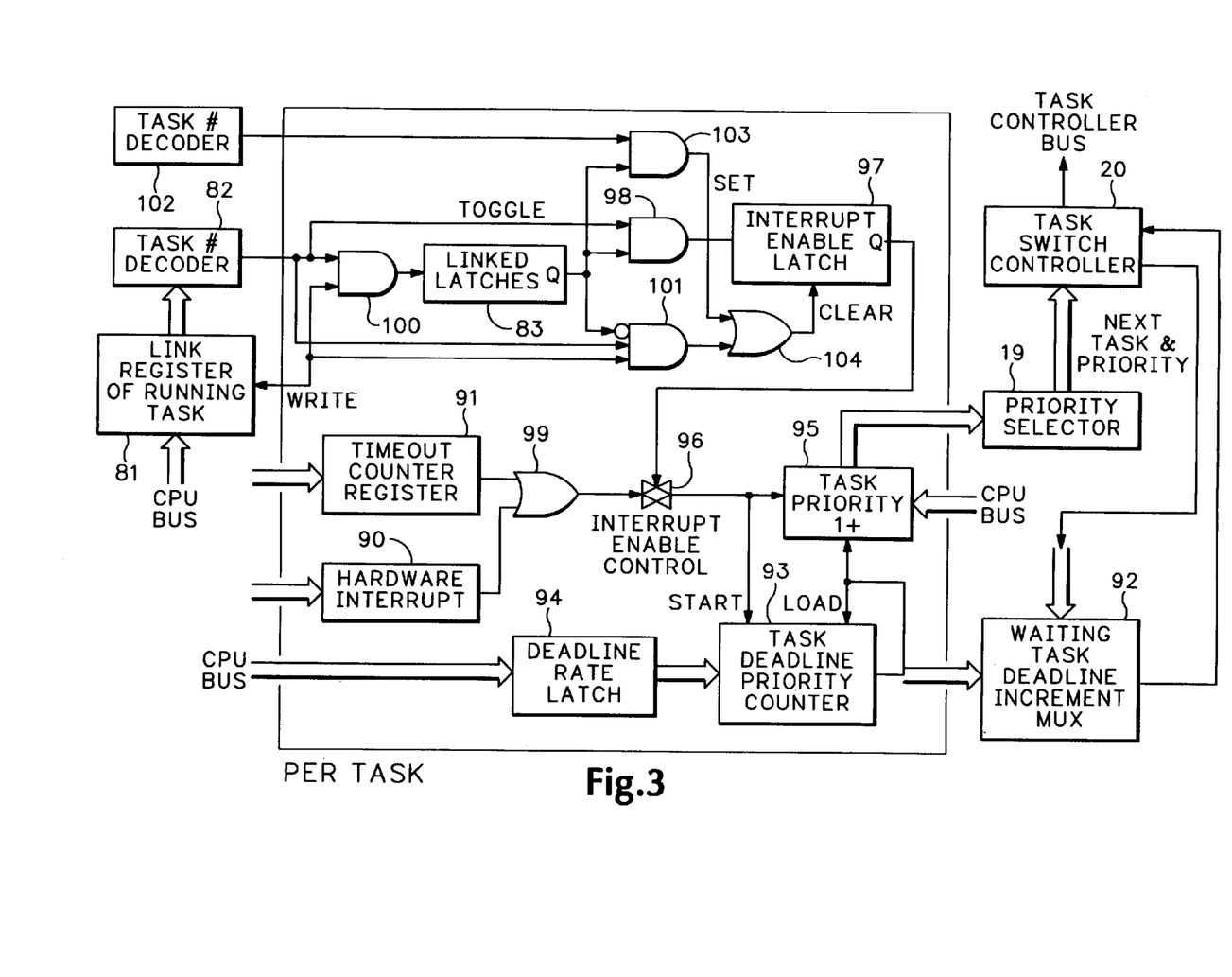
FIG. 3 is a block diagram of an interrupt and task change processing circuit.

FIG. 3 schematically illustrates the interrupt processing circuitry. The Hardware interrupts 90 contains all of the possible hardware sources for interrupts including external pins, and internal peripheral devices, and exception generators. In the preferred implementation, each of the major interrupt sources is assigned a fixed hardware task number. Alternatively, a flexible mapping between hardware and sources and tasks is possible. When the Time-out Counter Registers 91 reach their end count, they output an interrupt, just like any hardware interrupt 90 source. The task controlled by a time-out counter register 91 will run after the time-out counter register 91 finishes, and when running will automatically transfer the new time-out value from it's time-out counter register 91. The possible sources of interrupt, time-out counter registers 91, and hardware interrupts 90 combine in OR gate 99 and go to the Interrupt Enable Control 96.

Figure 3A:
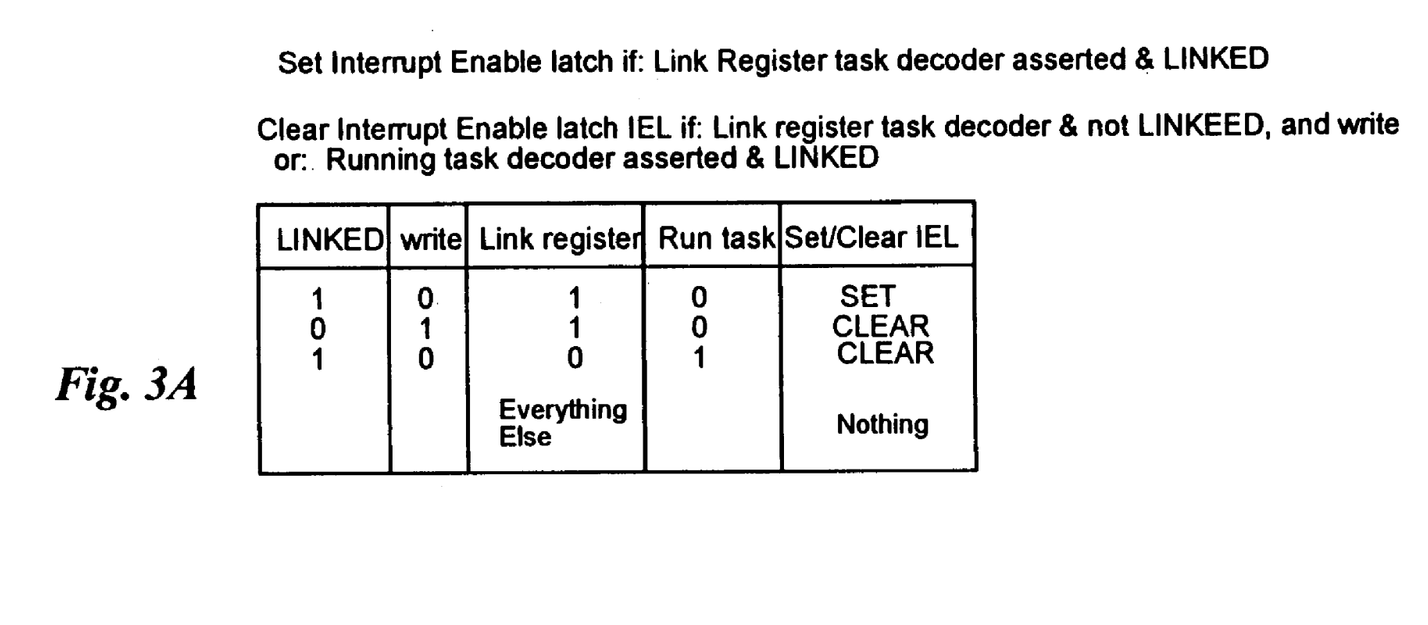

The Interrupt Enable Control switch 96 is controlled by the task link system. The task link system uses a Link Register 81 of the running task to toggle the LINKED latch 83 of a stored task, through task decoder 82 and AND gate 100. Writing to the Link Register 81 also disables the task specified. After the LINKED latch has been set, when the prerequisite task runs again it will re-enable the task specified in the Link Register 81. Then the task specified can run. At the end of the LINKED task running, it will disable its own interrupt enable latch 97 if its LINKED latch 83 was set, through task decoder 102 and AND gate 103 and OR gate 104. A logic diagram for this circuit is shown in the FIG. 3A. Thus, this circuit will guarantee that the linked task and the prerequisite task alternate running and that the LINKED task always runs after the prerequisite task and not before. Long chains of linked tasks are possible.

Interrupt signals that make it through the Interrupt Enable Control 96 then go to their task Priority counter register 95. This register is loaded from the task via the CPU BUS, whenever it runs with the starting priority of the task. The Deadline rate latch 94 is also loaded when the task runs, and then this is loaded into the Task Deadline Priority Counter 93. Interrupts that get through the Interrupt Enable Control 96 start the Task Deadline Priority Counter 93. The Task Deadline Priority Counter 93 counts until done, then outputs a signal to the Task Priority counter 95 to increase the task priority by 1. This same signal is used to reload the Deadline Rate Latch 94 into the Task Deadline Priority Counter 93. In this fashion, the task can be set to increase its priority after it has interrupted as its deadline approaches.

Each task feeds its priority from the task priority counter register 95 to the Priority selector 19. This circuit picks the highest priority task and passes the task number and priority to the Task switch controller 20. Since tasks can spend time waiting to run in one of the latches 4 or 3 (FIG. 1), the task priority Deadline Priority Counter 93 for the waiting task is passed through MUX 92 to the Task switch Controller 20. In this fashion the task controller 20 can keep increasing the priority of the waiting task until it exceeds the priority of the running task and then initiate a task swap.

Figure 2:
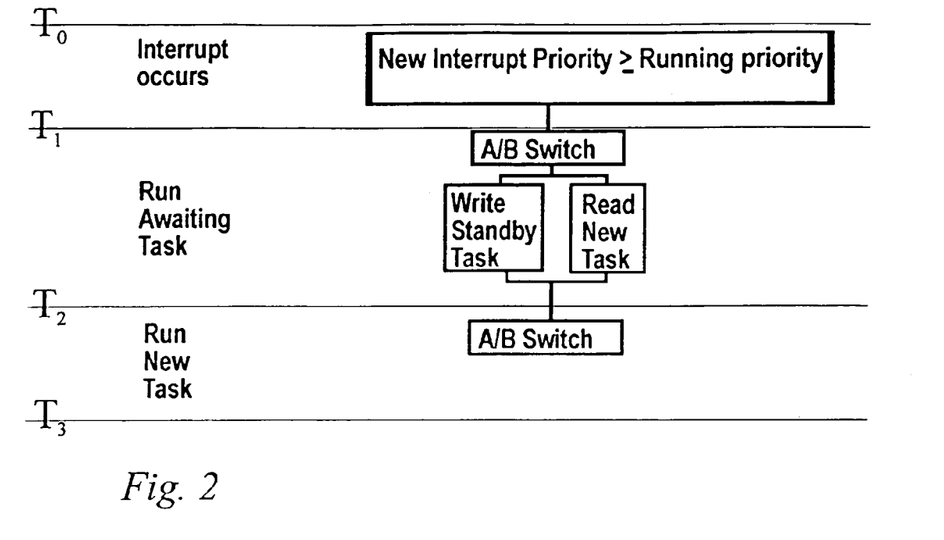
FIG. 2 is a flow chart illustrating task switching.

In the event that a plurality of equal priority tasks are simultaneously presented to the priority selector 19, the priority selector 19 will determine the priority and select the tasks sequentially. The task switch controller 20 uses a small state machine to sequence the task controller bus to accomplish a task switch. FIG. 2 shows a flow chart explaining the steps performed by the task switch controller 20 to accomplish a task switch.

At time zero, in FIG. 1, the circuit is set as follows: the CPU 1 is connected to latch 3; the task control bus A/B signal line is set to B; the latch 3 Q output goes through the multiplexer (MUX) 17 to CPU 1 input; the CPU 1 output goes through MUX 14 to latch 3 input D; the latch 4 outputs go through MUX 13 to SRAM 2 input; and, the SRAM 2 output goes through MUX 15 to latch 4 input D.

The first step in switching tasks is to read the task from SRAM 2 into a latch not being used by the CPU 1, in this case latch 4. This is accomplished by placing the interrupting task address on the task control bus TASK TO READ address bus. CLOCK B signal then stores that state into latch 4. (Since our example is from a cold start, there is no task in latch 4. Normally there will be a task there. This task can be written back into the SRAM 2 at the same time the new interrupt task is read out of SRAM 2, by asserting the TASK TO WRITE task destination addresses and then asserting the CLOCK SRAM line.) The new task is loaded into latch 4 at time T2 (FIG. 2). On the same clock edge or a fraction of a cycle later, the A/B control signal is changed to B, causing latch 4 to output and take input from CPU 1, and causing latch 3 to take input and to output to SRAM 2. At this point, if the original task interrupts again, the A/B line is toggled again to switch tasks without requiring a read from SRAM 2.

The above example is the start-up case. Normally, once started, there is a task waiting to run, when a new interrupt comes in. Thus, the waiting task could be "flushed" (thrown away). But, in the preferred embodiment, the waiting task is always run for at least one cycle while the new interrupt task is fetched from the SRAM 2 and the previous running task is saved to SRAM 2. In sequence, when latch 3 is connected to the CPU I and running a task, and while latch 4 is holding the next task scheduled to be run, if a new interrupt of equal or higher priority is detected by the priority selector 19 (FIG. 3), then at T1 (FIG. 2) the A/B line is toggled to B, causing the task data in latch 4 to become attached to the CPU 1, while latch 3 is now connected to the SRAM 2. The new interrupt task address is then put on the TASK TO READ task control bus, and the previous running task address is put on the TASK TO WRITE lines. At T2 (FIG. 2), the previous interrupt task data is clocked into the SRAM 2, the new interrupt task data is clocked into latch 3 and the CPU I will have clocked any data (if it was programmed to) into latch 4. The A/B line is then toggled again to A to run the new interrupt task out of latch 3.

Figure 4:
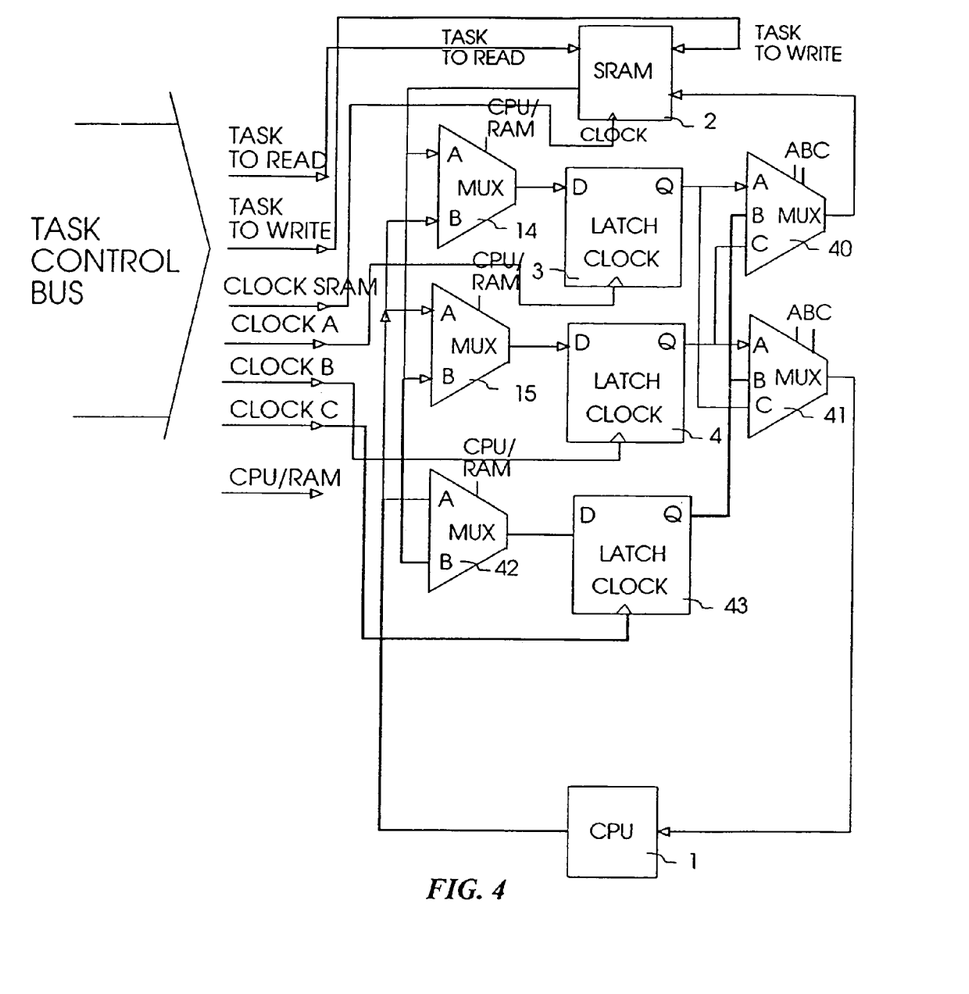
FIG. 4 is a circuit diagram of an alternate implementation of the interrupt and task change system using three latches instead of two.

Alternate implementations of the invention are possible. FIG. 4 shows a register bit implemented with 3 latches instead of 2. Here 3-input MUXs 40 & 41 replace the 2-input MUXs in the 2 latch design (FIG. 1). An additional MUX 42 is added to select SRAM 2 or CPU 1. The extra latch allows 3 tasks to have latencies of just I cycle. However, the circuit is larger per bit and somewhat slower because of the extra wiring and capacitance. There are also additional gate delays through MUXs 40 & 41 compared to the simpler MUXs 13 & 17 (FIG. 1). The optimum configuration for a given application depends on the specific characteristics of the integrated circuit manufacturing process used and the application's timing demands.

Figure 5:
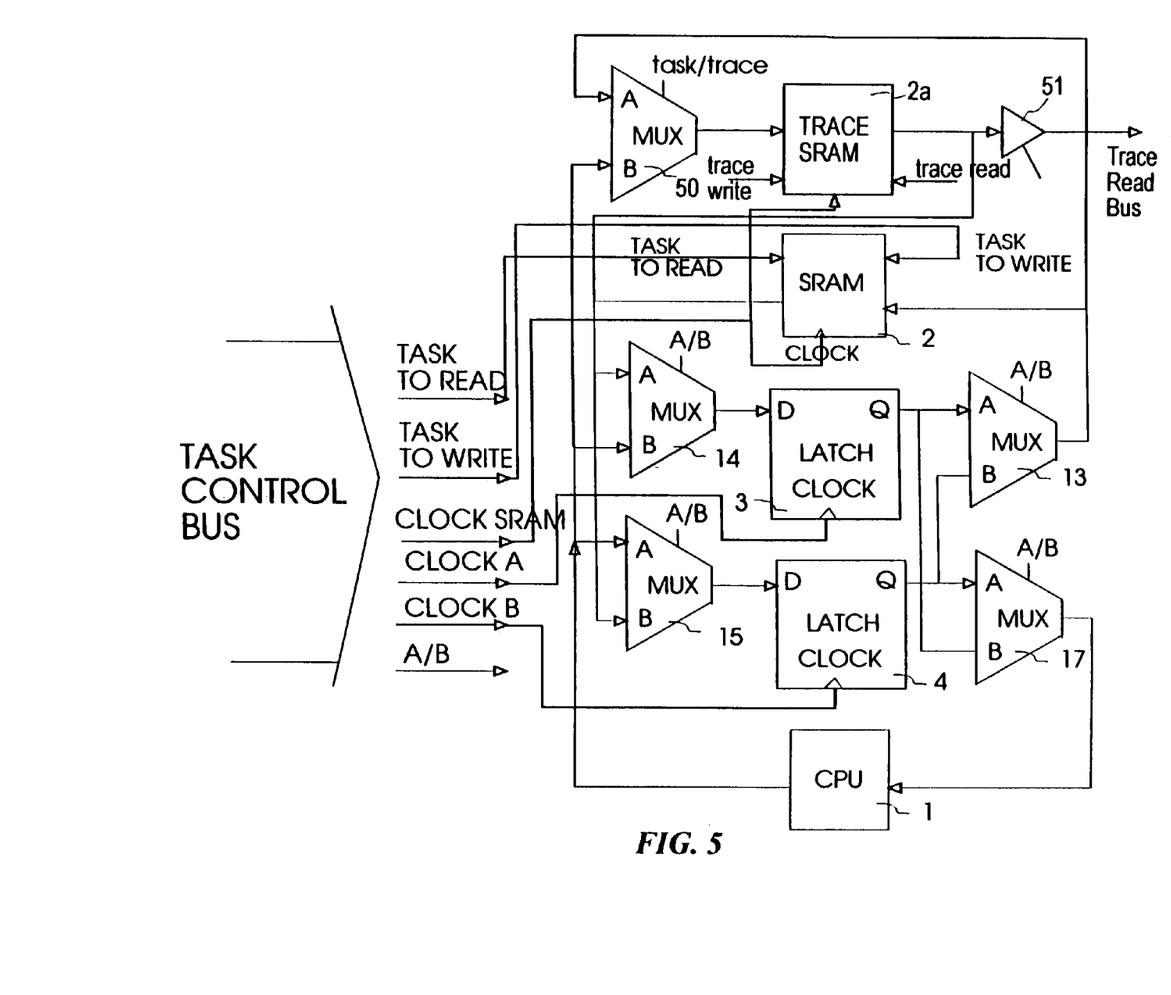
FIG. 5 is a circuit diagram of a task register with additional trace circuitry.
Figure 6:
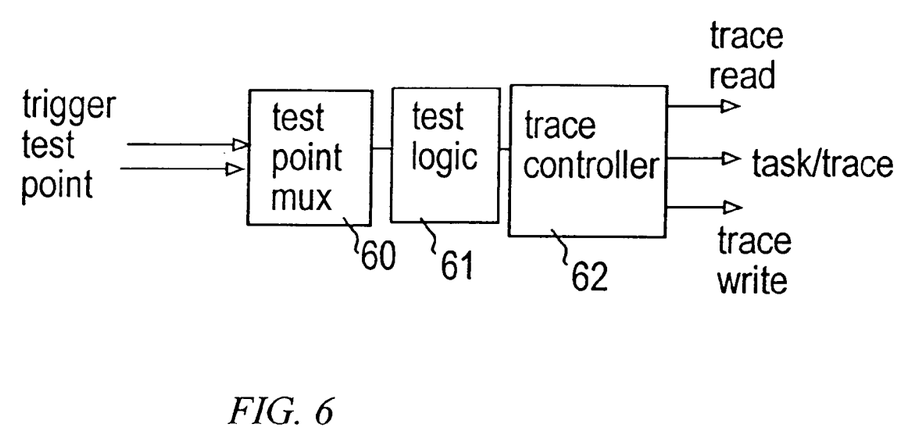
FIG. 6 is a block diagram of an implementation of the trace control system.
Figure 7:
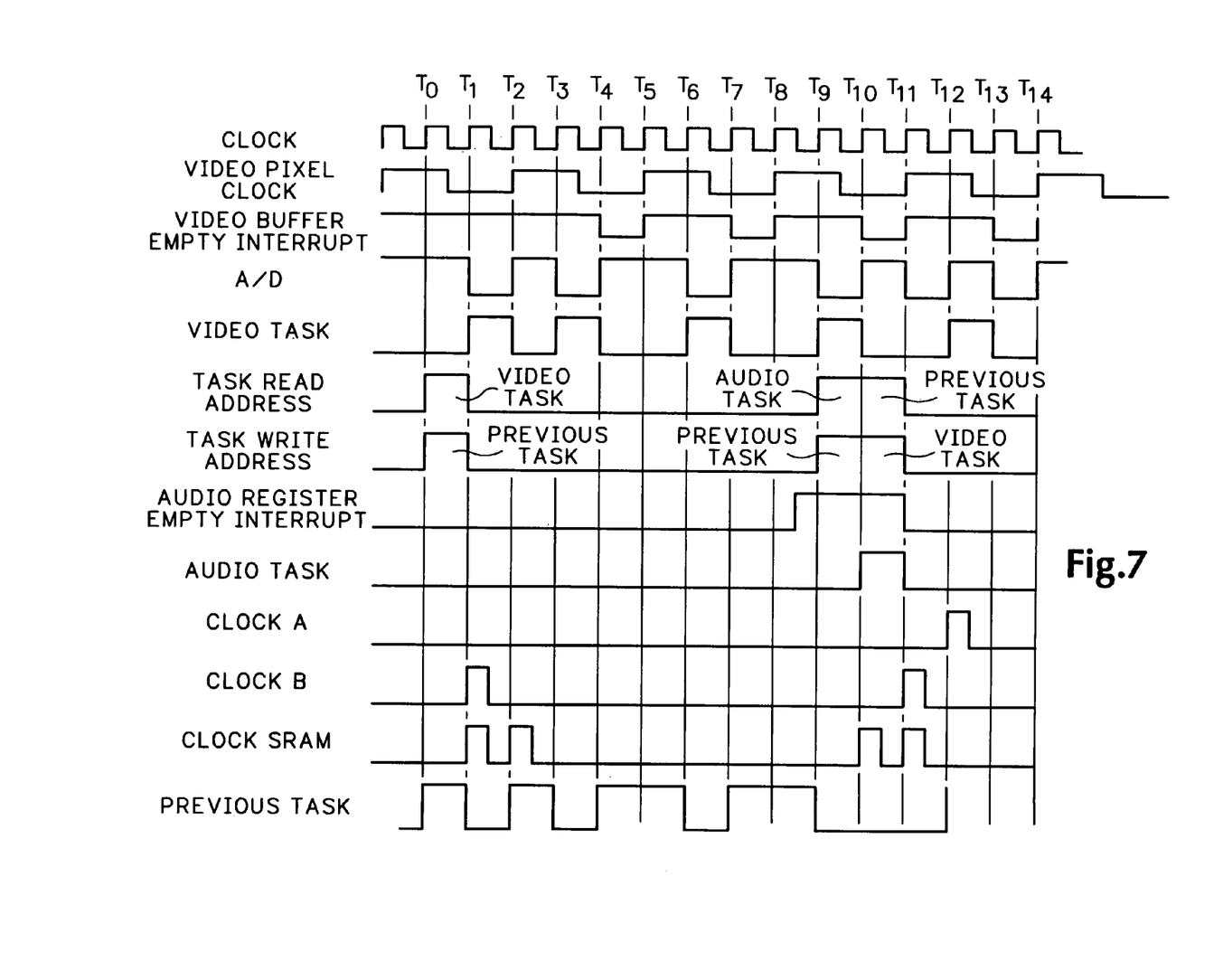
FIG. 7 is a timing diagram illustrating the control sequence for sample task switching.

FIG. 5 shows an implementation of the trace function. In addition to the task switching function described above and shown in FIG. 1, MUX 50 and tri-state switch 51 have been added. Trace SRAM 2a is used as either task switching SRAM 2 or as trace SRAM 2a by changing the addressing and trace/task control line to MUX 50. When CPU I stores into latch 3 or 4, if tracing, MUX 50 will pass data to trace SRAM 2a. FIG. 6 shows a block diagram of the trace controller. Various test points are selected by MUX 60 to logical testing by test logic 61. If the test logic indicates the situation matches a user test set point, the trace controller 62 begins tracing. The trace controller 62 in its simplest use, outputs sequential trace write addresses while asserting the trace signal. The trace controller can also be designed to trace continuously until an event occurs, then stop tracing, or trace for a few more steps, before stopping. Readout of the trace data is accomplished by asserting the pass control on tri-state 51 (FIG. 5) for each bit to be connected to the trace read bit. This data can be read out a bit at a time, since trace readout is not a time critical task, or it can be grouped together for register output by using a wider bus.

While various embodiments of the present invention have been described above, it should be understood that they have been presented by way of example, and not limitation. Thus the breadth and scope of the present invention should not be limited by any of the above described exemplary embodiments, but should be defined only in accordance with the following claims and their equivalents. It will be understood by those skilled in the art that various changes in form and detail may be made therein without departing from the spirit and scope of the invention.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a microprocessor-based computing system having a CPU for executing tasks represented by task register sets and further including peripheral devices that issue interrupt commands, an interrupt and task change processing circuit comprising:
    (a) a task enable circuit for determining from predetermined inputs whether a predetermined task is ready for execution by the central processing unit,
    (b) a task priority selection circuit coupled to an output of the task enable circuit for determining an order for the running of tasks that have been determined ready for execution by the task enable circuit; and
    (c) a task switching circuit coupled to an output of the task priority selection circuit for controlling the execution of tasks in a sequence determined by the task priority selection circuit, wherein the task switching circuit is coupled to a zero overhead multiplexing circuit for storing a later task in a first set of latches during a first clock cycle while simultaneously switching a previously stored earlier task stored in a second set of latches into a task switch controller during the same clock cycle.

2. In a microprocessor-based computing system having a CPU for executing tasks represented by task register sets and further including peripheral devices that issue interrupt commands, the combination comprising: (a) an interrupt and task change processing circuit for responding to interrupt commands and for placing tasks in an order of priority for execution by the CPU, and (b) a zero overhead multiplexing circuit coupled to the interrupt and task change processing circuit for storing a later task in a first set of latches during a first clock cycle while simultaneously switching a previously stored earlier task stored in a second set of latches into a memory unit during the same clock cycle.

3. The combination of claim 2 wherein the interrupt and task change processing circuit includes a task enable circuit for placing a task in a status in which it is ready for execution by the CPU.

4. The combination of claim 3 wherein the interrupt and task change processing circuit includes a task priority selection circuit for assigning a task priority to tasks which are ready for execution by the CPU.

5. The combination of claim 4 wherein the interrupt and task change processing circuit includes a task switching circuit for loading tasks ready for execution by the CPU into said zero overhead multiplexing circuit based upon their task priority.

* * * * *